(12) United States Patent
Fader

(10) Patent No.: US 6,893,034 B2
(45) Date of Patent: May 17, 2005

(54) STABILIZER BAR WITH BUSHINGS THAT REMAIN FIXED TO THE BAR

(75) Inventor: Joseph A. Fader, Brighton, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/271,461

(22) Filed: Oct. 15, 2002

(65) Prior Publication Data

US 2004/0070161 A1 Apr. 15, 2004

(51) Int. Cl.[7] .............................................. B60G 11/20
(52) U.S. Cl. ................................................ 280/124.166
(58) Field of Search ................... 280/124.166, 124.163, 280/124.167; 267/141.2; 403/289, 290

(56) References Cited

U.S. PATENT DOCUMENTS

| | | | | |
|---|---|---|---|---|
| 2,824,751 | A | * | 2/1958 | Wilfert ................. 280/124.166 |
| 4,750,757 | A | * | 6/1988 | Long ................... 280/124.106 |
| 4,854,766 | A | | 8/1989 | Hein |
| 4,883,287 | A | | 11/1989 | Murakami et al. |
| 4,951,962 | A | * | 8/1990 | Tomida et al. ........ 280/124.108 |
| 5,118,070 | A | | 6/1992 | Reid |
| 5,165,306 | A | | 11/1992 | Hellon |
| 5,224,790 | A | | 7/1993 | Hein |
| 5,290,018 | A | * | 3/1994 | Watanabe et al. ............ 267/293 |
| 5,505,482 | A | | 4/1996 | VanDenberg |
| 5,565,251 | A | * | 10/1996 | Tang et al. ................. 428/36.8 |
| 5,918,547 | A | | 7/1999 | Bullock et al. |
| 5,984,283 | A | * | 11/1999 | Tsuiki et al. ................... 267/33 |
| 6,286,821 | B1 | | 9/2001 | Schaffer |
| 6,363,613 | B1 | * | 4/2002 | Wolf et al. ............... 29/896.91 |
| 6,405,448 | B1 | * | 6/2002 | Watkins ....................... 33/645 |
| 6,474,631 | B2 | * | 11/2002 | Hadano et al. .............. 267/276 |
| 6,513,801 | B1 | * | 2/2003 | McCarthy .................... 267/293 |
| 6,536,594 | B2 | * | 3/2003 | Hayashi ...................... 248/632 |
| 6,554,305 | B2 | * | 4/2003 | Fulks .................. 280/124.107 |

FOREIGN PATENT DOCUMENTS

JP          06173990 A  *  6/1994   ............. F16F/1/38

OTHER PUBLICATIONS

Excerpt from Automotive Engineering International, May 2002, p. 66.

* cited by examiner

*Primary Examiner*—Faye M. Fleming
(74) *Attorney, Agent, or Firm*—Carlson, Gaskey & Olds

(57) ABSTRACT

A stabilizer bar assembly includes bushings secured to the bar such that there is no relative rotary movement between an inner surface on the bushings and an outer surface on the bar. In one example embodiment, the bushings are adhesively secured to the bar. In another example, the bushings are molded directly onto the bar. In example embodiments adhesively securing the bushing to the bar, a post bond adhesive is used and cured during a paint curing step after paint has been applied to the bar. Various example assemblies and methods of manufacturing are disclosed.

12 Claims, 2 Drawing Sheets

STABILIZER BAR WITH BUSHINGS THAT REMAIN FIXED TO THE BAR

BACKGROUND OF THE INVENTION

This invention generally relates to vehicle stabilizer bar assemblies. More particularly, this invention relates to stabilizer bar assemblies having bushings that do not move relative to the stabilizer bar.

Stabilizer bar configurations are well known as part of vehicle suspension systems. Conventional arrangements include a bar, rubber bushings and brackets for securing the stabilizer bar to an appropriate vehicle component. During normal operation, conventional arrangements tend to generate objectionable noise that results from rubbing action between the rubber bushings and the bar surface. Various attempts have been made to eliminate this aspect of conventional stabilizer bar arrangements.

One proposed solution has been to place a lubricant into the rubber material or to insert another material between the rubber bushing and the bar to facilitate relative motion between them. Injecting lubricants into the rubber material has been demonstrated to provide inconsistent noise correction. Introducing additional material such as Teflon has introduced additional cost and other difficulties into the arrangement.

Another variation is proposed in U.S. Pat. No. 5,224,790, which includes an inner sleeve that is supposed to remain stationary relative to the stabilizer bar and an outer bushing member that is rotatably moveable around the inner sleeve. The interface between the inner sleeve and the outer bushing member allows relative rotary movement between them and is supposed to eliminate squeaking noise.

There is a need for an improved stabilizer bar arrangement that out performs previous designs. This invention provides such an arrangement that avoids the shortcomings and drawbacks described above.

SUMMARY OF THE INVENTION

In general terms, this invention is a stabilizer bar assembly having bushings that are fixed relative to the stabilizer bar such that there is no relative rotary movement between the bushings and the bar.

In one example assembly designed according to this invention, a stabilizer bar has an outer surface. At least one bushing is adhesively secured to the outer surface of the bar such that there is no relative rotary movement between them. A bracket member surrounds the bushing and is secured to the bushing in a manner that prevents relative rotary movement between them.

The inventive arrangement acts as if it were a torsional spring because there is no relative rotary movement between the exterior of the bar and the interior of the bracket. The bushing between the bar and the bracket remains rotatably stationary relative to each.

In one example assembly designed according to this invention, the bushing is bonded to the exterior surface of the bar during a paint curing step for curing paint applied to an outer surface of the bar.

In another example assembly designed according to this invention, the bushing is molded directly onto the bar so that the resulting bushing remains rotatably fixed relative to the bar. The bracket is secured to the exterior of the bushing in one of several ways so that there is no relative rotation between the bracket and the bushing.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
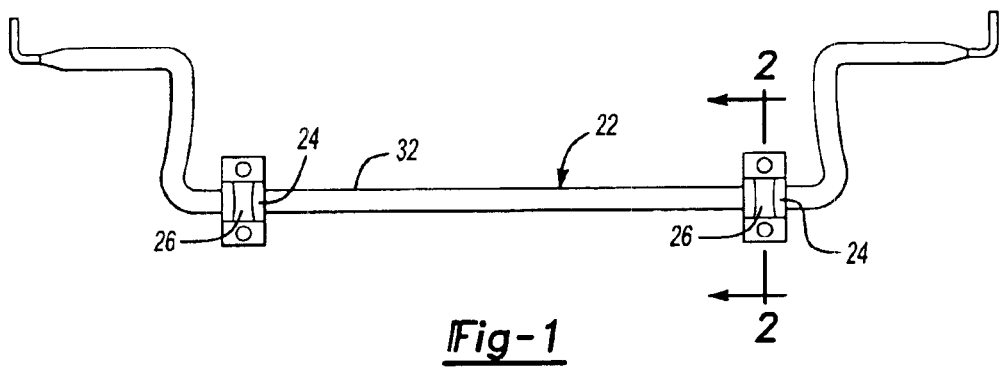
FIG. 1 schematically illustrates a stabilizer bar assembly designed according to this invention.

FIG. 1 schematically illustrates a stabilizer bar assembly 20 including a bar 22. In one example, the bar 22 is a hollow steel tube shaped in a known manner to perform the functions of a stabilizer bar. A plurality of bushings 24 are received about the exterior of the bar 22. Bracket members 26 and 28 are associated with each bushing 24 for securing the stabilizer bar to an appropriate location on a vehicle component.

Figure 2:
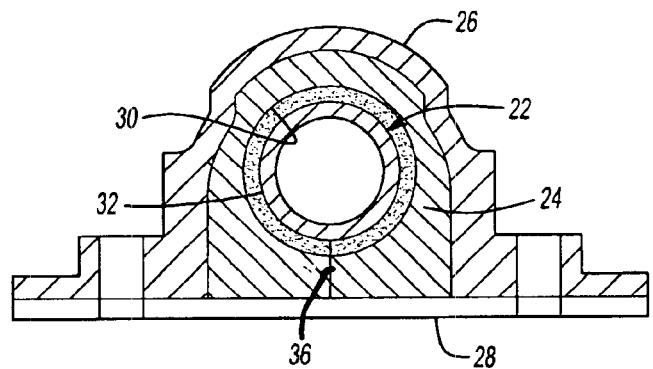
FIG. 2 is a cross-sectional illustration taken along the lines 2—2 in FIG. 1.

As best appreciated from FIG. 2, the bushing 24 includes an interior surface 30 that is secured directly to an exterior surface 32 on the bar 22. The bushing 24 includes a slit 36 that facilitates placing the bushing onto the bar during assembly. Once the bracket members 26 and 28 are secured in place, there is no relative rotational movement (i.e., slipping) between the bar 22, the bushing 24 and the brackets. According to this invention, the bushing remains fixed relative to the bar and the brackets the bushings 24 act as torsional springs responsive to any movement between the bar 22 and the bracket members 26 and 28.

In one example, the bushings are made from a rubber material. One example rubber believed useful for an assembly designed according to this invention is known by the 92322 STD 1223.22 designation. Other rubber materials having different specifications can be used for bushings in an assembly designed according to this invention. Those skilled in the art who have the benefit of this description will be able to select the materials best suited to meet the needs of their particular situation.

Figure 3:
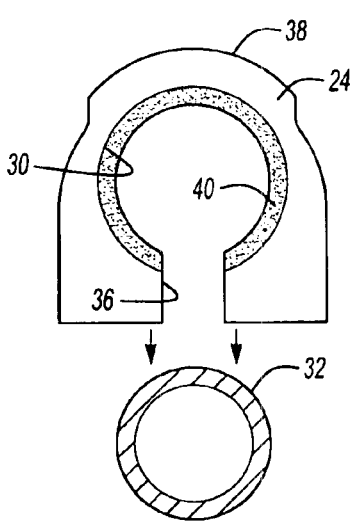
FIG. 3 schematically illustrates one example bushing designed according to this invention prior to being applied to a stabilizer bar.

In one example assembly designed according to this invention, the bushing 24 is adhesively secured to the outer surface 32 of the bar 22. As shown in FIG. 3, for example, the inner surface 30 includes an adhesive layer 40 that secures the inner surface 30 to the outer surface 32 of the bar 22.

In one example, the adhesive layer 40 comprises a post bond adhesive. The bar 22 comprises a steel bar with a shot peened outer surface 32. The bushing 24 preferably is made of rubber. In this example, the bracket members preferably comprise cold rolled low carbon steel.

In another example, the bar 22 comprises a steel bar with a painted outer surface 32. In this example, the adhesive layer 40 preferably comprises an adhesive material that is compatible with the paint that is applied to the outer surface 32 of the bar 22. Those skilled in the art who have the benefit of this description will be able to select from among commercially available materials to meet the needs of their particular situation.

An example assembly process useful with the example embodiment of FIG. 3 includes applying the adhesive layer 40, which comprises a post bond adhesive in this example, to the inner surface 30 of the bushing 24. The bushing then can be manipulated by opening the slit 36 to slide the bushing over the bar 22 so that the adhesive layer 40 is between the inner surface 30 of the bushing 24 and the outer surface 32 on the bar 22. The clamp members 26 and 28 preferably are then placed in position and spot welded or mechanically clamped together to compress the bushing 24 between the bar 22 and the brackets. Phosphate and paint preferably are then applied to the bar and brackets. During a baking cycle for curing the paint, the adhesive layer 40 secures the bushing 24 to the bar 22. In one example, the baking cycle lasts for approximately one-half hour at a temperature between 250° and 350° F.

The adhesive layer preferably has an adhesive strength on the order of 2.5 $N/mm^2$. A variety of commercially available adhesives that will withstand the pressures exerted on the bushing during stabilizer bar operation are known. Those skilled in the art who have the benefit of this description will be able to select the best adhesive to work for their particular situation. One example embodiment of this invention includes the adhesive material sold under the trade name Black Max available from the Loctite Corporation.

Figure 4:
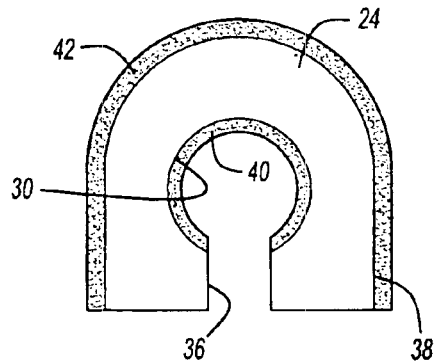
FIG. 4 schematically illustrates another example bushing designed according to this invention.

The preferred arrangement includes securing the bushing 24 to the brackets in a manner that prevents any relative rotation between them. As shown in FIG. 4, for example, a layer of the post bond adhesive 42 preferably is placed on the outer surface 38 of the bushing 24. This adhesive layer secures the bushing to the bracket member 26 at the same time that the inner surface 30 is secured to the outer surface 32 of the bar 22.

A variety of bushing and bracket configuration are possible within the scope of this invention. The illustrated examples show particular embodiments to which this invention is not limited.

Figure 5:
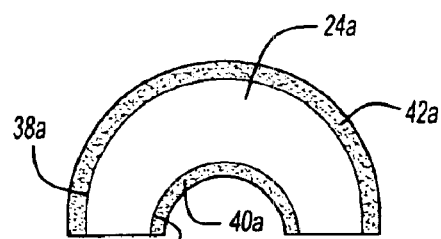
FIG. 5 schematically illustrates another example bushing designed according to this invention.
Figure 5:
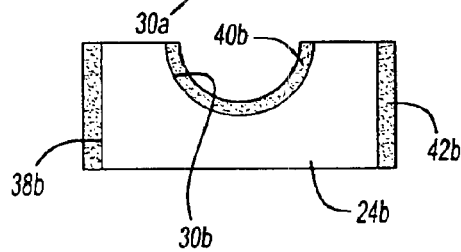

Another example bushing designed according to this invention is schematically illustrated in FIG. 5. In this example, the bushing includes halves 24A and 24B that are placed on opposite sides of the bar 22 so that the inner surfaces 30A and 30B are adhesively secured to the outer surface 32 of the bar 22. Post bond adhesive layers 40A and 40B are applied to the inner surfaces conveniently before the bushing halves 24A and 24B are placed about the bar 22. The adhesive layers can be cured later to secure the rubber bushing to the bar to prevent any relative rotary movement. In this example, appropriate portions of the outer surfaces 38A and 38B include a post bond adhesive layer 42A or 42B, respectively.

Figure 6:
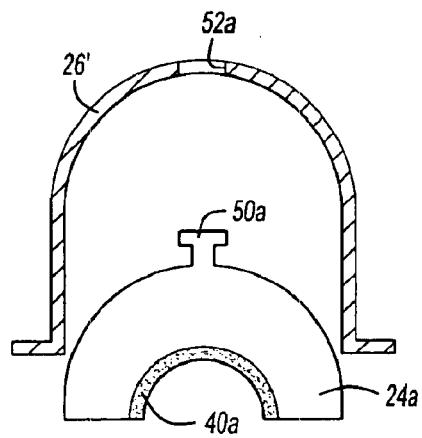
FIG. 6 illustrates yet another example bushing designed according to this invention with an alternative arrangement for securing the bushing to a bracket.

Another example arrangement is shown in FIG. 6. In this example, the bushing comprises two halves 24A and 24B that are placed about the bar 22 after an adhesive layer 40A, 40B is applied to the inner surface 30A, 30B of the bushing halves. In this example, each bushing half includes at least one attachment member 50A, 50B that is received by a corresponding portion of at least one of the bracket members to prevent relative rotation between the bracket members and the bushing. In the example of FIG. 6, the attachment members 50A and 50B comprise tabs that extend away from the exterior of the bushing halves. Openings 52A and 52B in the bracket member 26' receive the tabs during assembly so that the interaction between the attachment members 50A and 50B and the openings 52A and 52B, respectively, prevent relative rotary movement between the bushing 24 and the bracket.

Figure 7:
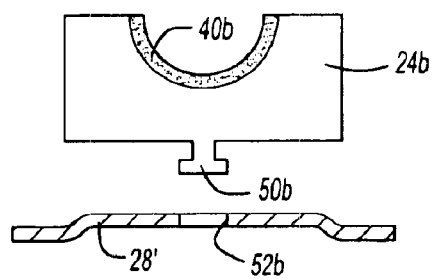
FIG. 7 schematically illustrates a method of making still another example stabilizer bar assembly designed according to this invention.
Figure 7:
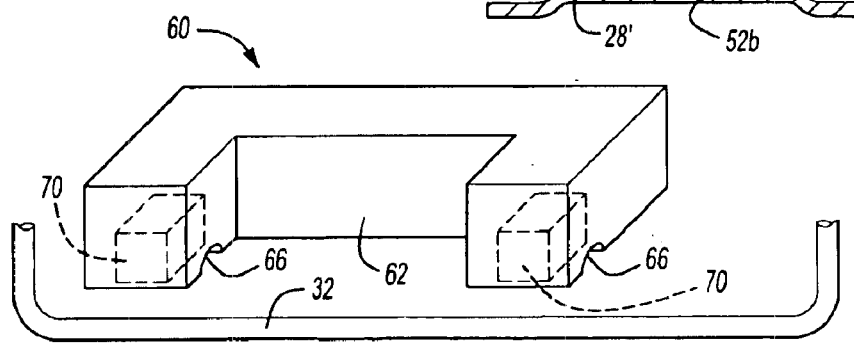
Figure 7:
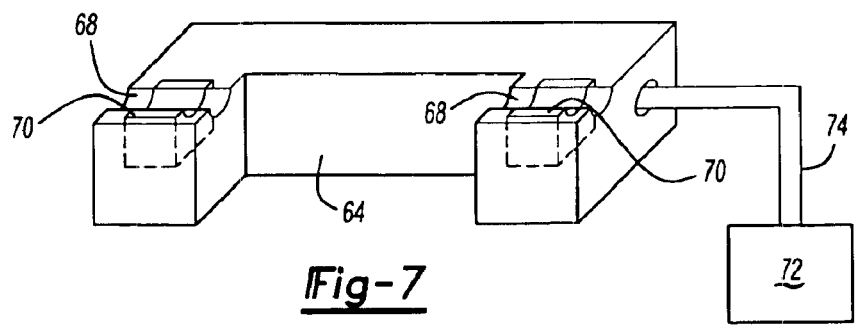

In another example embodiment designed according to this invention, the bushings 24 are molded onto the outer surface 32 of the bar 22. FIG. 7 schematically illustrates an arrangement for making such a stabilizer bar assembly. A device 60 includes mold halves 62 and 64. The bar 22 preferably is made and then positioned appropriately between the mold halves 62 and 64. The illustrated example includes contoured surfaces 66 and 68 on the mold halves for receiving the bar as can be appreciated from the schematic illustration. The mold halves each include a recess 70 into which the material for making the bushings (e.g., rubber) is supplied during the manufacturing process. A supply of bushing material 72 is fed through conduit 74 into the mold recesses 70 to form the bushings about the outer surface 32 of the bar By molding the bushings directly onto the bar, they are secured against rotary movement relative to the bar.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A stabilizer bar assembly, comprising:
   a bar having an outer surface;
   at least one bushing adhesively secured to the outer surface of the bar such that there is no relative rotary movement between the bushing and the bar; and
   a bracket member received about at least a portion of an outer surface of the bushing that includes at least one attachment member extending away from the outer surface of the bushing, the bracket member having at least one cooperating recess into which at least a portion of the attachment member is received and wherein there is no relative rotary movement between the bracket member and the bushing.

2. The assembly of claim 1, including an adhesive between the outer surface of the bar and an inner surface on the bushing.

3. The assembly of claim 2, including an adhesive layer between the outer surface of the bushing and an inner surface on the bracket member.

4. The assembly of claim 1, wherein the bar comprises steel and the outer surface of the bar is shot peened.

5. The assembly of claim 1, wherein the bar comprises steel and the outer surface of the bar is painted.

6. The assembly of claim 1, wherein the bushing has a plurality of attachment members extending away from the outer surface of the bushing and the bracket member has a corresponding plurality of recesses.

7. A stabilizer bar assembly, comprising:
   a bar having an outer surface;
   at least one bushing molded onto the bar such that the bushing surrounds the bar and is secured to the bar so that there is no relative rotary movement between the bar and the bushing; and a bracket member received about an outer surface of the bushing that includes at least one attachment member extending away from the outer surface of the bushing, the bracket member having at least one cooperating recess into which at least a portion of the attachment member is received and wherein there is no relative rotary movement between the bushing and the bracket member.

8. The assembly of claim 7, wherein the bracket member is adhesively secured to the outer surface of the bushing.

9. The assembly of claim 7, wherein the bar comprises steel and the outer surface of the bar is shot peened.

10. The assembly of claim 7, wherein the bushing has a plurality of attachment members extending away from the outer surface of the bushing and the bracket member has a corresponding plurality of recesses.

11. The assembly of claim 7, wherein the recess in the bracket member comprises an opening through the bracket member and at least a portion of the attachment member extends through the opening.

12. The assembly of claim 11, including a plurality of attachment members and a corresponding plurality of openings in the bracket member.

\* \* \* \* \*